United States Patent
Wilhelmsson

(10) Patent No.: US 8,072,896 B2
(45) Date of Patent: Dec. 6, 2011

(54) ADAPTIVE COEXISTENCE BETWEEN DIFFERENT WIRELESS COMMUNICATION SYSTEMS

(75) Inventor: Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 74 days.

(21) Appl. No.: 12/142,175

(22) Filed: Jun. 19, 2008

(65) Prior Publication Data
US 2009/0262785 A1    Oct. 22, 2009

Related U.S. Application Data

(60) Provisional application No. 61/046,288, filed on Apr. 18, 2008.

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl. ........ 370/252; 370/280; 370/281; 370/478; 455/114.2; 455/296

(58) Field of Classification Search ............. 370/252, 370/280, 281, 328, 330, 332, 342, 344, 347, 370/430, 478; 375/133, 144, 148; 455/553.1, 455/562.1, 114.2, 296
See application file for complete search history.

(56) References Cited

U.S. PATENT DOCUMENTS

| | | | | |
|---|---|---|---|---|
| 5,210,771 A * | 5/1993 | Schaeffer et al. | ............. | 375/132 |
| 5,546,411 A * | 8/1996 | Leitch et al. | .................. | 714/708 |
| 5,831,545 A * | 11/1998 | Murray et al. | ................ | 340/7.27 |
| 5,907,812 A * | 5/1999 | Van De Berg | ................ | 455/461 |
| 6,212,172 B1 * | 4/2001 | Barabash et al. | ............. | 370/277 |
| 6,269,086 B1 * | 7/2001 | Magana et al. | ............... | 370/280 |
| 6,434,122 B2 * | 8/2002 | Barabash et al. | ............. | 370/277 |
| 6,788,253 B1 * | 9/2004 | Calin | ............................ | 342/464 |
| 7,146,133 B2 * | 12/2006 | Bahl et al. | ..................... | 455/63.1 |
| 7,149,205 B2 * | 12/2006 | Nakamura et al. | ............ | 370/343 |
| 7,248,567 B2 * | 7/2007 | Desgagne et al. | ............ | 370/277 |

(Continued)

FOREIGN PATENT DOCUMENTS

EP    1 077 582 A    2/2001

(Continued)

OTHER PUBLICATIONS

PCT International Search Report, mailed Aug. 10, 2009, in connection with International Application No. PCT/EP2009/054532.

*Primary Examiner* — Aung S Moe
*Assistant Examiner* — Benjamin H Elliott, IV
(74) *Attorney, Agent, or Firm* — Potomac Patent Group PLLC

(57) ABSTRACT

A first transceiver is operated in a first frequency band in the presence of a second transceiver operating in a second frequency band. Operation includes ascertaining an interference level at the first transceiver due to the second transceiver. A coexistence strategy for the second transceiver is dynamically selected by selecting a frequency division strategy if the ascertained interference level is less than a threshold level and selecting a time division strategy if the ascertained interference level is above the threshold level. The second transceiver is then caused to operate in accordance with the dynamically selected coexistence strategy.

26 Claims, 4 Drawing Sheets

U.S. PATENT DOCUMENTS

| | | | |
|---|---|---|---|
| 7,280,836 B2 * | 10/2007 | Fuccello et al. | 455/452.1 |
| 7,480,490 B2 * | 1/2009 | Haartsen | 455/73 |
| 7,522,924 B2 * | 4/2009 | Abeta et al. | 455/452.2 |
| 7,555,030 B2 * | 6/2009 | Fukuda et al. | 375/132 |
| 7,610,385 B2 * | 10/2009 | Hundal et al. | 709/227 |
| 7,634,231 B2 * | 12/2009 | Hundal | 455/63.1 |
| 2002/0105913 A1 * | 8/2002 | Miya | 370/241 |
| 2002/0196804 A1 * | 12/2002 | Ishiguro et al. | 370/442 |
| 2004/0152416 A1 * | 8/2004 | Dahl | 455/41.2 |
| 2004/0264393 A1 * | 12/2004 | Desgagne et al. | 370/294 |
| 2005/0181823 A1 | 8/2005 | Haartsen | |
| 2005/0191964 A1 | 9/2005 | Hundal | |
| 2006/0215795 A1 | 9/2006 | Nafie et al. | |
| 2007/0054620 A1 * | 3/2007 | Zeira et al. | 455/63.1 |
| 2007/0086408 A1 * | 4/2007 | Kuroda et al. | 370/344 |
| 2007/0165754 A1 * | 7/2007 | Kiukkonen et al. | 375/346 |
| 2007/0197256 A1 | 8/2007 | Lu et al. | |
| 2007/0248043 A1 | 10/2007 | Afrashteh et al. | |
| 2009/0116437 A1 * | 5/2009 | Alexandre et al. | 370/329 |
| 2009/0262785 A1 * | 10/2009 | Wilhelmsson | 375/133 |
| 2010/0046464 A1 * | 2/2010 | Kwak et al. | 370/330 |

FOREIGN PATENT DOCUMENTS

| | | |
|---|---|---|
| GB | 2 376 607 A | 12/2002 |
| WO | 2007/017871 A2 | 2/2007 |

* cited by examiner

ADAPTIVE COEXISTENCE BETWEEN DIFFERENT WIRELESS COMMUNICATION SYSTEMS

CROSS REFERENCE TO RELATED APPLICATIONS

This application claims the benefit of U.S. Provisional Application No. 61/046,288, filed Apr. 18, 2008, which is hereby incorporated herein by reference in its entirety.

BACKGROUND

The present invention relates to wireless telecommunication systems, and more particularly to methods and apparatuses that enable multiple radio systems to operate in similar radio spectrums and/or located geographically near to each other.

When a few decades ago, spectrum regulations were changed to allow commercial radio applications in unlicensed bands, interest was marginal. But this interest has changed radically in the last few years. After the worldwide success of mobile telephony in licensed bands, capacity limitations and huge license fees have spurred the interest of radio applications in the unlicensed band. In the past few years, communications systems such as those operating in accordance with the Wireless Local Area Network (WLAN) IEEE 802.11 standards and the Bluetooth® standards have been increasingly deployed in the 2.4 GHz band. Moreover, new communications systems are being worked on, such as the Wireless Personal Area Network (WPAN) activity under IEEE 802.15.

Radio spectrum, even unlicensed, is limited. Despite this, ubiquitous communications using several different standards is foreseen in the near future. Coexistence is not trivial as different standards follow different protocols. Moreover, regulations, initially intended to provide fair sharing, are constantly changing to allow for higher data rates, yet moving away from robustness requirements. The use of an unlicensed band poses the challenge of coexistence. In the design phase of a new communication system that has to operate in the unlicensed band, the developer has to design units that will be expected to share the band with:

Incumbent non-communications: Power unintentionally radiated by equipment, for example microwave ovens, will be a source of disturbance.

Incumbent communications: Intended radiation by other communication systems like for example WLAN, Bluetooth®, or Radio Frequency-Identification (RF-ID) will also be experienced as disturbance when no coordination is applied.

Future systems: Systems that do not exist yet but which will be built in the future can cause severe disturbances. The only known factors are the restrictions imposed upon these systems by the regulations. However, as discussed before, regulations are changing over time, making predictions rather unreliable.

Coexistence can be handled in a number of different ways, as will now be discussed.

Interference mitigation by applying direct-sequence spreading or forward-error-correction coding can be useful, but is usually insufficient due to the near-far problem. That is, in ad-hoc scenarios in particular, a jamming transmitter can come very close to a receiver. The power levels received can thus be sufficiently strong to bring the front-end of the receiver into saturation, which causes clipping. As a result of the clipping (which imposes non-linear effects) the effective gain decreases (desensitization) and intermodulation products arise.

Avoidance is another method of mitigating interference. Avoidance in time can be applied by listening-before-talk or Carrier Sense Multiple Access/Collision Avoidance (CSMA/CA) as applied in IEEE 802.11 and other standards. However, this renders suboptimal solutions because the collision measurements render absolute power levels whereas the Packet Error Rate (PER) depends on the Carrier-to-Interference (C/I) ratio.

Avoidance in frequency is provided by frequency agile techniques such as Dynamic Frequency Selection (DFS). In this method, the system measures where in the frequency band other transmitters are active, and subsequently avoids these frequency segments. This is fine when potential jammers broadcast their presence continuously, for example on a control channel. However, measuring on bursty data channels results in unreliable measurements. Hopping provides better mitigation methods based on frequency avoidance. Because of the large isolation between the intended signal and the jammer when the hopper and jammer do not coincide, rather good robustness can be obtained. However, frequency hopping only works when the jammers are narrowband; likewise, time hopping only works when jammers have a low duty cycle. Incumbent systems in the unlicensed bands usually are bandwidth restricted but are rarely duty cycle restricted, posing a problem for time hopping systems like Ultra-Wideband (UWB) Impulse Radio.

Arranging for the different systems to use different frequencies is another coexistence technique. However, when the different transceivers are located in the very same device or are otherwise very close to one another, practical problems relating to filtering out strong interference result in the use of different frequency bands being insufficient to avoid interference between the different systems unless those different frequency bands are sufficiently separated from one another.

More particularly, when the different systems are sufficiently separated in frequency, coexistence is typically ensured by means of filtering. In this way the systems can be treated independent of one another, as if the other systems were not at all present. In such cases, the performance of each system will be unaffected of operation of the other systems. The cost associated with this approach is the possibility of very hard requirements on the necessary filters. In addition, a filter also causes attenuation loss of the desired signal, known as the insertion loss. This results in degraded sensitivity for systems that employ such hard filtering.

When the different systems operate very close to one another in frequency, filtering is generally not a feasible solution, due to the very hard requirement on the attenuation required to ensure that the victim system will not be severely degraded.

Thus, often the only feasible way of coexistence is the use of time division, in which the systems are coordinated in time so that no two systems are active at the same time. One issue related to coexistence by means of time division is that some kind of collaboration between the systems usually is needed. For instance, if it is known by one system that another system is receiving, the former might delay its transmission not to interfere with the latter. Alternatively, the latter system might choose not to use the information received in case it knows the former is transmitting, and instead rely on that the information can be obtained anyway through powerful coding and time interleaving or possibly by retransmission mechanisms.

Coordination between the systems is, for example, the typical approach used when Bluetooth® and WLAN technology are co-located in the same device. A method known as Packet Traffic Arbitration (PTA) is used, and this results in one of the two standards being given priority over the other one.

A problem with using coexistence solutions based on time division is that the systems that are given low priority might not work well. For instance, it might not be possible to guarantee the desired Quality of Service (QoS) of one system if there is another active system having a higher priority. Another problem is the poor utilization of the available spectrum. If only one system is used at a time, parts of the spectrum will always be unused for data transmission, and effectively used only as a guard band.

Today, the ISM band at 2.4-2.485 GHz is used both by Bluetooth® technology and by WLAN. Both of these incompatible technologies can be found in mobile phones, and the percentage of phones that will have both Bluetooth® and WLAN technology built into them will increase in the future. The bands used for the cellular standards, like the Global System for Mobile Communication (GSM) and Wideband Code Division Multiple Access (WCDMA) are today located several hundred MHz away from the ISM band, and ensuring co-existence between for instance Bluetooth® technology and the cellular standards has been easily achieved by means of filtering. However, with the introduction of technology built in accordance with the Worldwide Interoperability for Microwave Access (WiMAX) standard, which might be used in the 2.3 GHz band, filtering might not be sufficient to ensure co-existence. Also, with the International Mobile Telecommunications-2000 (IMT-2000) extension band located at 2.5-2.69 GHz, filtering alone will not suffice to ensure coexistence with standards using the 2.4 GHz ISM band.

As these various communication devices become smaller, the number of transceivers in different devices like mobile phones, personal digital assistants (PDAs), laptop computers, and the like is increasing. This means that co-existence between different systems is an issue that can be expected to become even more pronounced in the future.

Therefore, it is desirable to have methods and apparatuses that enable various radio communication systems to coexist with one another in an efficient way.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that operate a first transceiver in a first frequency band in the presence of a second transceiver operating in a second frequency band. Operation includes ascertaining an interference level at the first transceiver due to the second transceiver. A coexistence strategy for the second transceiver is dynamically selected by selecting a frequency division strategy if the ascertained interference level is less than a threshold level and selecting a time division strategy if the ascertained interference level is above the threshold level. The second transceiver is then caused to operate in accordance with the dynamically selected coexistence strategy.

In some embodiments, the frequency division strategy comprises filtering out interference.

In some embodiments, ascertaining the interference level at the first transceiver due to the second transceiver comprises ascertaining a transmit power level of the second transceiver.

In some alternative embodiments, ascertaining the interference level at the first transceiver due to the second transceiver comprises ascertaining how close a transmit frequency of the second transceiver is to a receive frequency of the first transceiver.

In yet some other alternative embodiments, the first transceiver operates across a fixed bandwidth and the second transceiver utilizes frequency hopping; and ascertaining the interference level at the first transceiver due to the second transceiver comprises ascertaining how many hop frequencies of the second transceiver are within a predefined distance from one or more receive frequencies of the first transceiver.

In still other alternative embodiments, ascertaining the interference level at the first transceiver due to the second transceiver comprises ascertaining an expected level of transmit activity of the second transceiver.

In some embodiments, operation of the first transceiver in any of the various embodiments is repeated periodically.

In some alternatives, operation of the first transceiver comprises determining whether a session will require more than one dynamic selection of a coexistence strategy and if so then periodically repeating the dynamic coexistence strategy selection, and otherwise making an initial dynamic selection of a coexistence strategy and then using the selected coexistence strategy throughout an entire communication session. In some of these embodiments, determining whether a session will require more than one dynamic selection of a coexistence strategy comprises determining an anticipated length of the communication session.

In still other alternatives, operation of the first transceiver comprises ascertaining an expected length of a communication session; and comparing the expected length of the communication session with a threshold length. In such embodiments, operation of the first transceiver to dynamically select a coexistence strategy based on ascertained interference is not performed if the expected length of the communication session is less than the threshold length.

In yet other alternatives, the threshold level is selected as a function of a transmission scheme used by the first transceiver. This is in recognition of the fact that the first transceiver may be able to tolerate more interference from the second transceiver if it (the first transceiver) operates in accordance with a more robust transmission scheme, and vice versa.

In other aspects, similar processes can be carried out to control the first transceiver's operations to prevent it from causing unacceptable levels of interference at the second transceiver.

BRIEF DESCRIPTION OF THE DRAWINGS

The objects and advantages of the invention will be understood by reading the following detailed description in conjunction with the drawings in which.

DETAILED DESCRIPTION

Figure 1A:
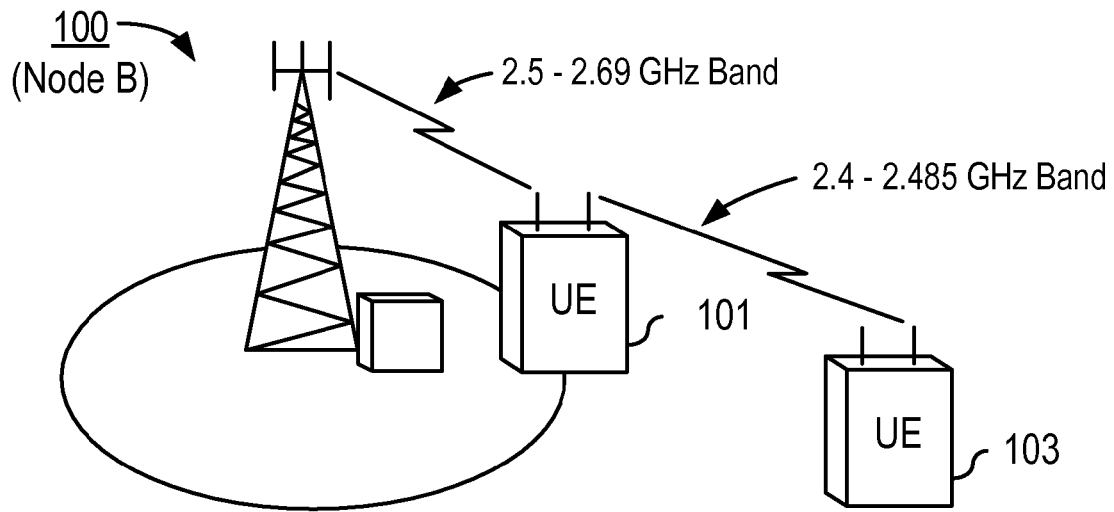
FIG. 1a is a block diagram illustrating coexistence problems that arise when a user equipment communicates with a Node B of a cellular telecommunications system using one frequency band, and also communicates with a second user equipment using a second frequency band.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

The inventor has recognized that co-existence solutions that are currently in use are designed for worst case interference scenarios, and do not take advantage of situations in which the actual interference level allows for better coexistence alternatives to be employed. Accordingly, in one aspect of embodiments consistent with the invention, the actual interference situation is assessed. Filtering is applied if the assessed interference level is low enough to allow for it. Otherwise (i.e., in the case of strong interference), coexistence is achieved by ensuring that one system is not transmitting when another is receiving. This time alignment of operation is preferably not achieved by completely turning off a system, but rather by trying to ensure that the transmission and reception of the different systems are aligned to as large an extent as possible.

By employing the above strategy, which dynamically determines whether to use frequency division or time division to achieve coexistence, substantially better usage of the spectrum and improved QoS support for the different co-located systems is achieved when the interference is not at its worst case level.

These and other aspects are described in further detail in the following discussion.

To more easily appreciate the various aspects of the invention and understand its merits, exemplary embodiments utilizing two specific standards are described. However, the inventive methods and apparatuses should not be considered restricted to these specific examples, since the described methods and apparatuses are equally well usable in connection with other communication standards, and generalizations to more than two standards are also possible.

FIG. 1a is a block diagram of a Node B (base station) 100 of a cellular telecommunications system. In this example, the air interface of the cellular communications system operates in accordance with WCDMA standards, and communications take place in the 2.5-2.69 GHz band. To illustrate coexistence situations, a first user equipment (UE) 101 is depicted communicating with the Node B 100. To enable these communications, the first user equipment includes first transceiver circuitry designed to operate in accordance with any version/release of the WCDMA standard.

The first user equipment 101 also includes second transceiver circuitry designed to operate in accordance with Bluetooth® standards, and these communications take place in the 2.4-2.485 GHz ISM band. As is well-known, Bluetooth® technology utilizes adaptive frequency hopping spread spectrum techniques, which avoid using crowded frequencies in the hopping sequence, thereby improving resistance to radio frequency interference. In the illustrated example, the first user equipment 101 is engaged in Bluetooth®-compatible communications with a second user equipment 103.

In the example illustrated in FIG. 1a, the first transceiver's communications in the 2.5-2.69 GHz band are subject to interference from the second transceiver's operation in the 2.4-2.485 GHz band, and vice versa. The co-location of the first and second transceivers within the same device (e.g., the first user equipment 101) makes this especially problematic.

Figure 1B:
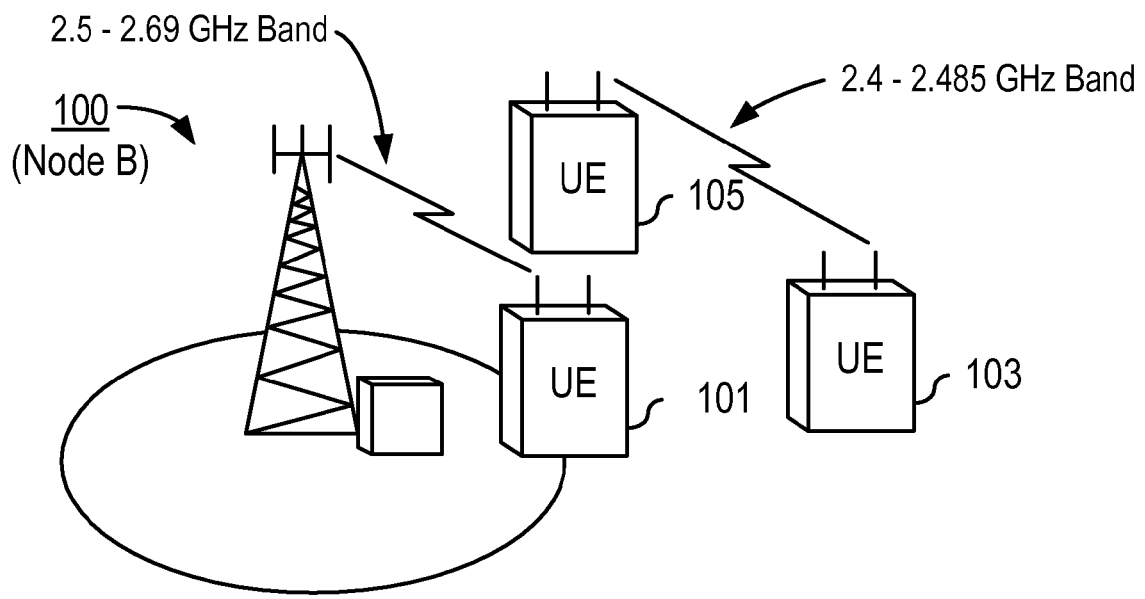
FIG. 1b is a block diagram illustrating coexistence problems when a user equipment communicates with a Node B of a cellular telecommunications system using one frequency band while nearby second and third user equipments communicate with each other by means of a second frequency band.

However, coexistence problems can exist even when the two transceivers are not located in the same device. FIG. 1b is a block diagram illustrating one such example. Here, the first user equipment 101 is engaged only in WCDMA communications with the Node B 100. Although the first user equipment 101 is depicted with two antennas, representing the co-location of first and second transceivers within the first user equipment 101, the second transceiver is presumed to be turned off in this example. Alternatively, the first user equipment could house only the WCDMA transceiver. (This latter situation is not depicted in FIG. 1b.)

Respective second and third user equipments 103 and 105 are engaged in communications on the 2.4-2.485 GHz band in accordance with any version of the Bluetooth® standard, and are presumably physically close enough to the first user equipment 101 for coexistence to be problematic for any one, two, or three of the devices.

Figure 2:
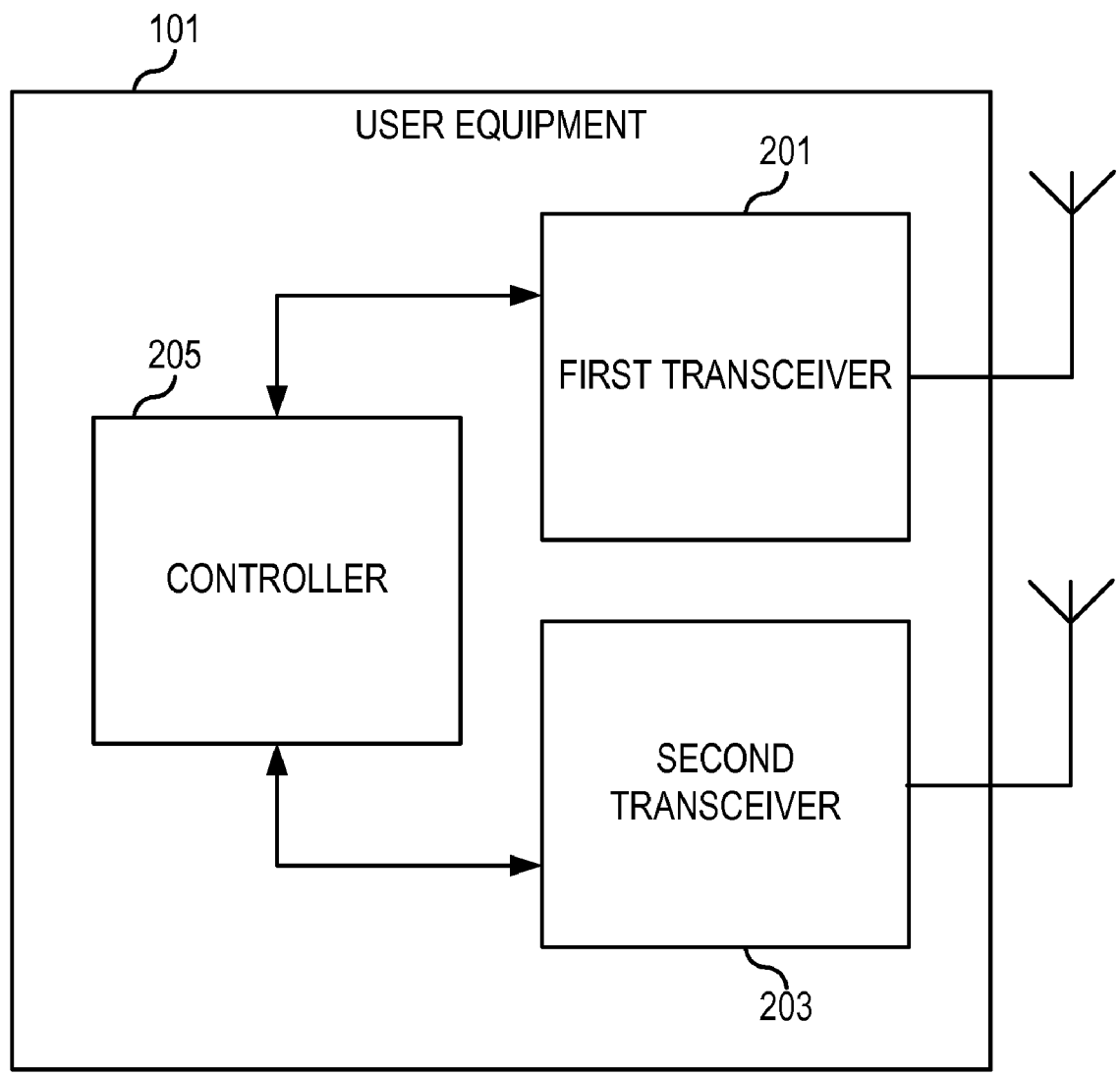
FIG. 2 is a block diagram of an exemplary user equipment adapted to carry out various aspects of the invention.

To address the problems illustrated in FIGS. 1a and 1b, each of the user equipments 101, 103, 105 comprises logic configured to operate the one or more transceivers housed within those devices to enable coexistence to occur. FIG. 2 is a block diagram of an exemplary user equipment 101 adapted to carry out various aspects of the invention. The user equipment 101 includes a first transceiver 201 that operates in accordance with a first standard (e.g., WCDMA), and a second transceiver 203 that operates in accordance with a second standard (e.g., Bluetooth®). A controller 205 comprises logic configured to operate the first and second transceivers in a way that strives to achieve optimum performance of the first and second transceivers 201, 203 while enabling their operation to coexist with one another. Those having ordinary skill in the art will appreciate that in practice, a user equipment 101 includes other well-known circuitry (e.g., user interface circuitry, channel estimation circuitry, other processing circuitry, etc.) whose operation is unrelated to the present invention and that, for the sake of clarity, has been omitted from the figure.

Figure 3A:
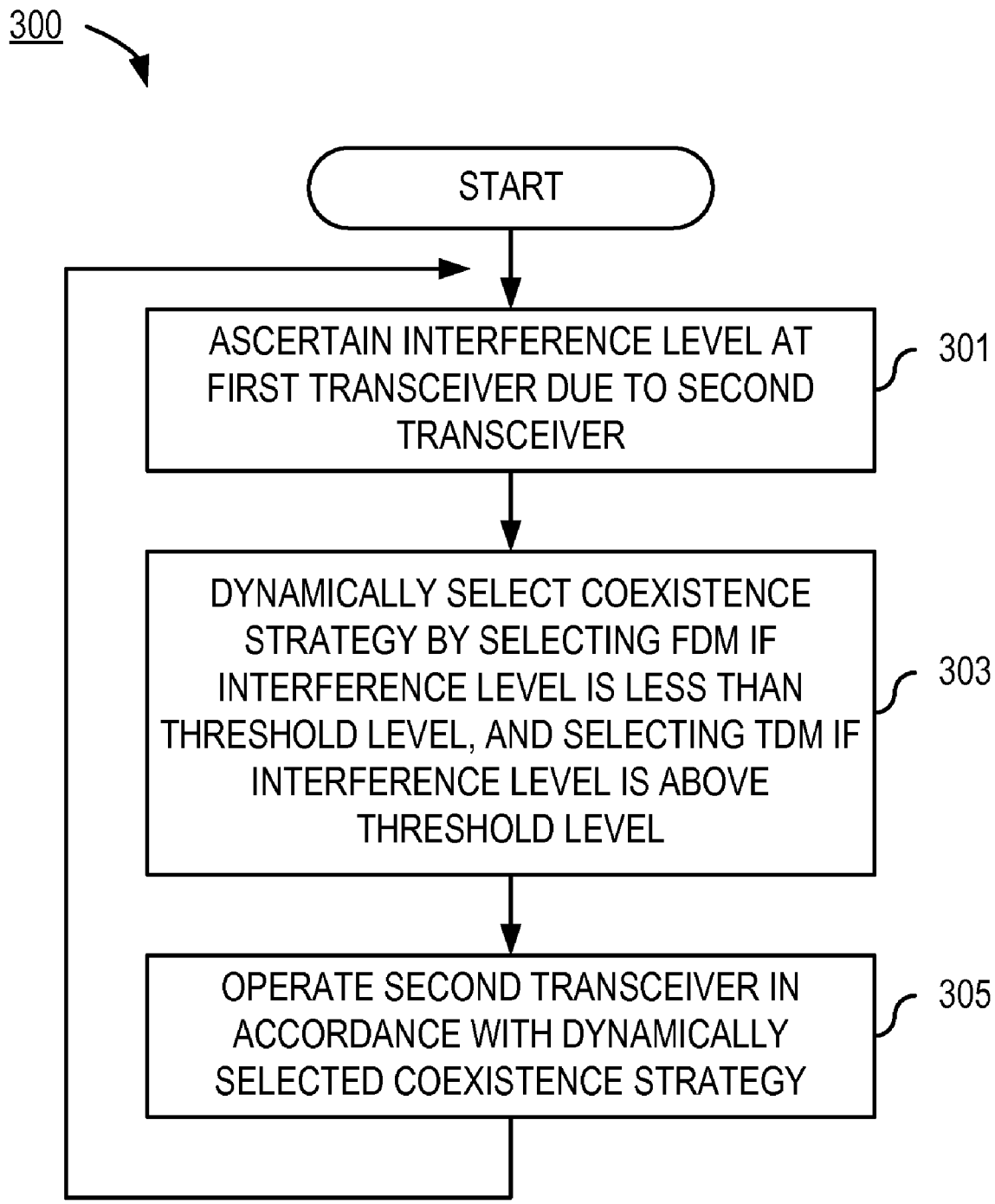
FIG. 3a is, in one respect, a flow diagram of exemplary steps/processes carried out by a user equipment in accordance with aspects of the invention.

FIG. 3a is, in one respect, a flow diagram of exemplary steps/processes carried out by a user equipment (e.g., by the controller 205 in the user equipment 101) in accordance with aspects of the invention. FIG. 3a can also be considered to depict an exemplary user equipment 300 comprising various logic configured to carry out the functions described herein.

The strategy broadly adopted in this exemplary embodiment is, for each of the transceivers, to determine whether an experienced or expected level of interference from a second transceiver is low enough to permit a frequency division-based coexistence strategy (e.g., using filtering alone to substantially eliminate interference) to be used. The use of an FDM strategy permits each of the transceivers to maximize their usage of the transmission medium. However, if the experienced or expected level of interference is not low enough to permit a frequency division-based strategy to be used, then at least the interfering transceiver (and possibly both transceivers) instead uses a time division-based strategy. This enables the user equipment to avoid the need for very complicated filters having the various detrimental effects discussed in the Background section of this document.

Accordingly, the UE 101 operates in accordance with the method of FIG. 3a, whereby its first transceiver is operated in a first frequency band in the presence of a second transceiver operating in a second frequency band. The first and second transceivers may be co-located with one another within the UE 101, but this is not a requirement. Operation includes ascertaining an interference level at the first transceiver due to the second transceiver (step 301). Various ways for doing this are discussed below. The interference level can be one that is presently experienced by the UE 101, or alternatively can be one that is anticipated to occur.

Once the interference level is ascertained, a coexistence strategy is dynamically selected by selecting a frequency division strategy if the ascertained interference level is less than a threshold level and selecting a time division strategy if the ascertained interference level is above the threshold level (step 303). Whether frequency division or time division is selected when the ascertained interference level is exactly equal to the threshold will depend on how the threshold level is set in any given application, and will therefore be application-specific.

The second transceiver is then caused to operate in accordance with the dynamically selected coexistence strategy (step 305). The process is repeated periodically to permit changes in coexistence strategy selection, since operating conditions between the first and second transceivers can change over time. This is discussed further below.

Having selected an operation strategy for the second transceiver, the process is essentially repeated but this time to determine a coexistence strategy for the first transceiver (i.e., selecting a frequency division-based coexistence strategy for the first transceiver if actual/expected interference from the first transceiver (experienced by the second transceiver) is below a threshold level and selecting a time division-based coexistence strategy for the first transceiver if actual/expected interference from the first transceiver is above the threshold level).

To further illustrate aspects of how co-existence can be achieved, consider the case in which two transceivers, each for use with a respective one of two systems, denoted A and B, are co-located. This leads to the possibility of four different situations that can occur if each of the systems simply tries to operate without taking into account its impact on the other. These situations are presented in Table 1:

TABLE 1

| Case | Transceiver A performance | Transceiver B performance |
| --- | --- | --- |
| 1 | Satisfactory | Satisfactory |
| 2 | Satisfactory | Unsatisfactory |
| 3 | Unsatisfactory | Satisfactory |
| 4 | Unsatisfactory | Unsatisfactory |

In Case 1, Transceiver A's satisfactory performance in the presence of Transceiver B's operation means that Transceiver B can operate using an FDM coexistence strategy. Similarly, Transceiver B's satisfactory performance in the presence of Transceiver A's operation means that Transceiver A can also operate using an FDM coexistence strategy.

However, cases 2 through 4 require that at least one of the transceivers operate using a TDM coexistence strategy. For example, consider case 2. This is exemplified by Transceiver A utilizing WCDMA technology and having an uplink frequency band that is close to the ISM band and a downlink frequency that is far from, and therefore unaffected by, transmissions on the ISM band; and Transceiver B utilizing Bluetooth® technology (i.e., frequency hopping is used on the ISM band). In this case, only Transceiver A needs to operate in accordance with a TDM strategy (i.e., refraining from transmitting at least when Transceiver B will be receiving); Transceiver B can continue to operate using an FDM strategy. (Of course, embodiments can be made in which both Transceivers A and B use TDM whenever even one of them requires it, but it should be apparent that this will not always be required.)

Case 3 is the reverse of case 2: Transceiver A can operate using an FDM strategy, while Transceiver B needs to employ a TDM strategy that prevents it from transmitting when Transceiver A will be receiving.

In case 4, each of the transceivers is detrimentally affected by operation of the other, so each of the Transceivers A and B needs to operate in accordance with a TDM strategy in which neither transmitter transmits when the other is expected to receive.

Figure 3B:
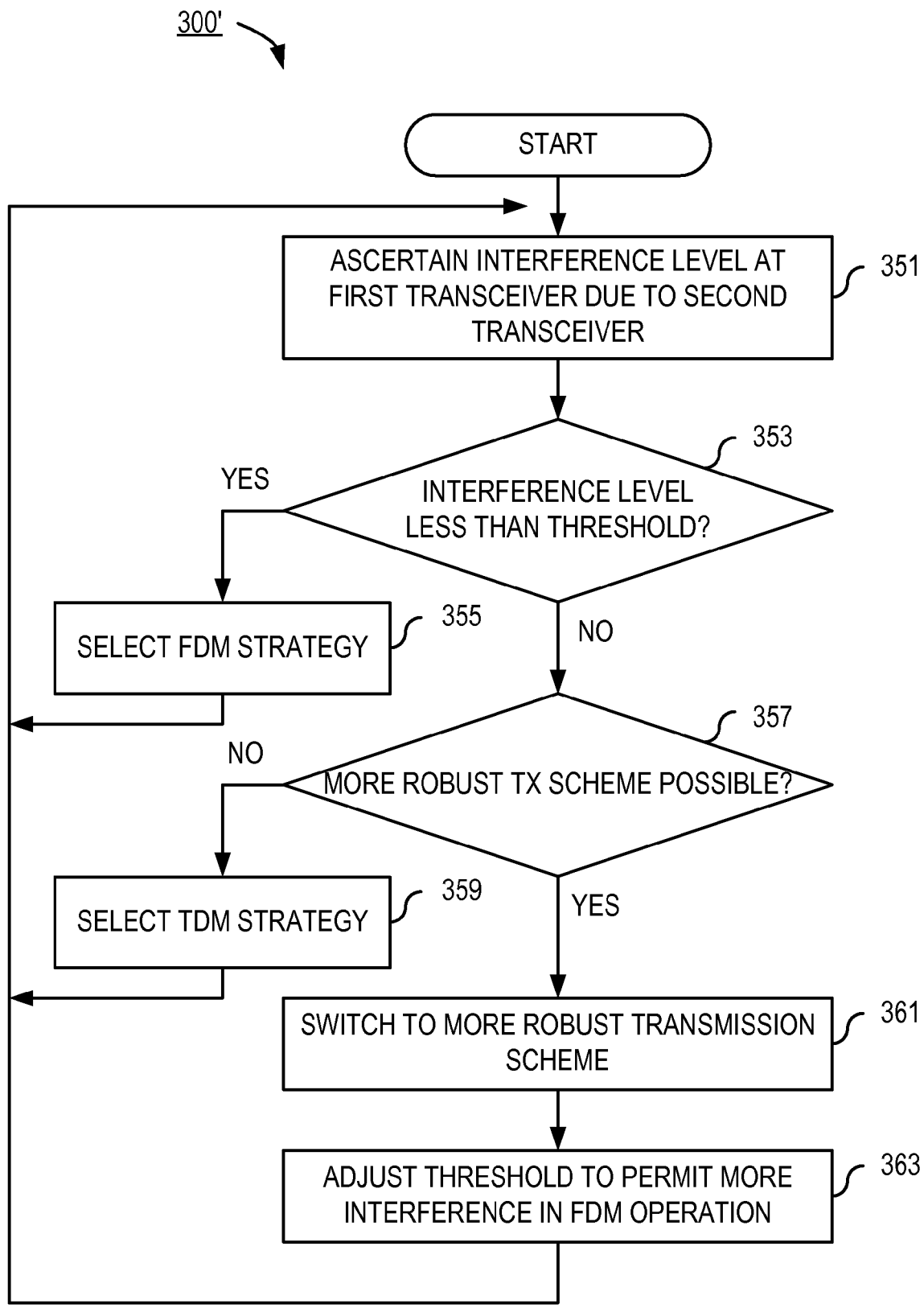
FIG. 3b is, in one respect, a flow diagram of exemplary steps/processes carried out by a user equipment in accordance with other aspects of the invention.

Embodiments consistent with aspects illustrated in FIG. 3a utilize a threshold value to determine whether a level of interference can be tolerated by a receiver. In another aspect of embodiments consistent with the invention, this threshold value need not be static, but can itself be dynamically determined based on operating conditions. These aspects will now be described in connection with FIG. 3b, which is, in one respect, a flow diagram of exemplary steps/processes carried out by a user equipment (e.g., by the controller 205 in the user equipment 101) in accordance with aspects of alternative embodiments of the invention. FIG. 3b can also be considered to depict an exemplary user equipment 300' comprising various logic configured to carry out the functions described herein.

The strategy broadly adopted in this exemplary embodiment is, for each of the transceivers, to determine whether an experienced or expected level of interference from a second transceiver is low enough to permit a frequency division-based coexistence strategy (e.g., using filtering alone to substantially eliminate interference) to be used. As with other embodiments, the use of an FDM strategy permits each of the transceivers to maximize their usage of the transmission medium. However, if the experienced or expected level of interference is not low enough to permit a frequency division-based strategy to be used, then the transceiver's operation is switched to a more robust transmission scheme that would allow FDM operation to proceed in the presence of the existing interference, if possible. The threshold value is adjusted accordingly to account for the fact that more interference can be tolerated without requiring a switch to TDM operation. If a switch to a more robust transmission scheme cannot be made (or would not be effective at permitting FDM operation in the presence of existing interference), at least the interfering transceiver (and possibly both transceivers) is controlled so as to use a time division-based strategy. In this way, the threshold level is dynamically selected as a function of the transmission scheme used by the first transceiver.

Accordingly, the UE 101 operates in accordance with the method of FIG. 3b, whereby its first transceiver operates in a first frequency band in the presence of a second transceiver operating in a second frequency band. The first and second transceivers may be co-located with one another within the UE 101, but this is not a requirement. Operation includes ascertaining an interference level at the first transceiver due to the second transceiver (step 351). Various ways for doing this are discussed below. The interference level can be one that is presently experienced by the UE 101, or alternatively can be one that is anticipated to occur.

Once the interference level is ascertained, it is determined whether the ascertained interference level is less than a threshold level (decision block 353). If the ascertained interference level is less than the threshold level ("YES" path out of decision block 353), an FDM strategy is selected for the second transceiver (step 355).

If the ascertained interference level is not less than the threshold level ("NO" path out of decision block 353), it is determined whether the first transceiver's communications can operate in accordance with a more robust transmission scheme (such as more powerful coding and/or smaller modulation alphabet) so as to allow FDM operation (decision block 357). If not ("NO" path out of decision block 357), at least the second transceiver (and possibly both transceivers) are caused to operate in accordance with a TDM strategy (step 359) to avoid the interference experienced by the first transceiver.

However, if the first transceiver's communications can operate in accordance with the more robust transmission scheme so as to allow FDM operation ("YES" path out of decision block 357), the first transceiver's operations (at least the receive operations) are switched to the more robust transmission scheme (step 361). This would typically include corresponding signaling to the transceiver (not shown) that is sending signals to the first transceiver so as to cause it to similarly switch to the more robust transmission scheme.

Having made the transmission scheme switch, the threshold value is adjusted to permit more interference to be experienced in FDM operation without causing a switch to TDM operation (step 363).

Having made a dynamic determination of coexistence strategy (any of steps 355, 359, and 363), the process is essentially repeated but this time to determine a coexistence strategy that enables the second transceiver to avoid interference from the first transceiver.

It will be appreciated that the selection of a time division-based coexistence strategy requires coordinated operation of the first and second transceivers (e.g., one of the transceivers should not be receiving when the other is transmitting). This coordination can easily be incorporated into the UE when the two (or more) transceivers are co-located within the same device; a controller can be devised to generate and send suitable control signals to each of the co-located transceivers. However, co-location of the transceivers is not a requirement because coordination can also be achieved between separate user equipments by means of, for example, a special signaling channel. Techniques for permitting otherwise incompatible transceivers to establish and utilize such a signaling channel are described, for example, in U.S. Patent Application No. 2005/0181823 to Jacobus C. Haartsen. In this case, the controller of one user equipment generates control signals that are then communicated to the transceiver in the other user equipment by means of a signaling channel that is established between them.

The discussion will now focus on exemplary techniques for carrying out steps 301 and 351, that is, ascertaining the interference level at the first transceiver due to the second transceiver. In some embodiments, this is accomplished by ascertaining a transmit power level to be used (or presently in use) by the second transceiver, since the transmit power level will be directly related to the amount of experienced/expected interference it will cause. This information is especially easy to obtain when the two transceivers are co-located within a same device.

In alternative embodiments consistent with the invention, ascertaining the interference level at the first transceiver due to the second transceiver is accomplished by ascertaining how close a transmit frequency of the second transceiver is to a receive frequency of the first transceiver. This is useful when, for example, the second transceiver is utilizing adaptive frequency hopping, wherein at any given moment, the second transceiver may or may not be utilizing hop frequencies that are close to a receive frequency of the first transceiver.

In some alternative embodiments consistent with the invention, ascertaining the interference level at the first transceiver due to the second transceiver is accomplished by ascertaining how many hop frequencies of the second transceiver are within a predefined distance from one or more receive frequencies of the first transceiver. Even if one or more hop frequencies are close to a receive frequency of the first transceiver, the expected level of interference may be low (thereby permitting the use of a frequency division-based strategy) if there are relatively few of them, so that the second transceiver is more often operating on hop frequencies that are farther away.

In still other alternative embodiments, consistent with the invention, ascertaining the interference level at the first transceiver due to the second transceiver is accomplished by ascertaining an expected level of transmit activity of the second transceiver. If the second transceiver is not expected to transmit very often, the first transceiver may be able to utilize a frequency division-based coexistence strategy and tolerate the rarely-occurring interference.

Various aspects of embodiments consistent with the invention will now be further described by way of example. Assume that one of the transceivers operates in accordance with the WCDMA standard, and that another one of the transceivers operates in accordance with the Bluetooth® standard. More specifically, suppose that the Up-Link (UL) for WCDMA (i.e., communications in the direction from a UE to the Node B) is allocated to the 2.5-2.505 GHz band, whereas the Down-Link (DL) (i.e., communications in the direction from the Node B to a UE) is allocated to the 2.620-2.625 GHz band. Further, suppose that the power of the WCDMA signal transmitted in the UL is effectively attenuated by 70 dB if viewed from one Bluetooth® channel within the ISM band. This attenuation is here assumed to be a result of filtering, antenna coupling loss, and the like. This means, then, that if the output power of the WCDMA transmitter is +24 dBm (which is the maximum value), the interference level experienced by the Bluetooth® transceiver is −46 dBm. However, the WCDMA transceiver does not necessarily always transmit at its maximum power. To the contrary, the output power of the WCDMA transmitter might be as little as −50 dBm, in which case the interference experienced by the Bluetooth® transceiver will be only −120 dBm.

A high performance Bluetooth® receiver might have a noise floor at around −105 dBm and a sensitivity of about −90 dBm. If the interference level is at −110 dBm, its impact might be considered to be very small, whereas if the interference level is significantly above that, for example at the sensitivity level of −90 dBm, it might completely ruin the performance.

Embodiments consistent with the invention avoid the need to design for the worst-case scenario (which would require the use of TDM at all times) by instead first determining the actual/expected interference caused by the WCDMA system (e.g., by ascertaining the output power of the WCDMA system). Then this interference level (e.g., output power level) is compared with a threshold value. If the ascertained value is above the threshold value, then co-existence between the Bluetooth® system and the WCDMA system is based on TDM. However, if the interference level is found to be below the threshold, this is taken to mean that the interference is at such a low level that it will only marginally degrade the performance of the Bluetooth® systems, so no TDM strategy is used.

Now considering the DL of the WCDMA system, this is seen to be almost 150 MHz away from the closest Bluetooth® channel. In this case, it should be possible to ensure that the Bluetooth® transmitter does not cause any degradation to the WCDMA receiver.

However, since Bluetooth® technology uses frequency hopping over a 79 MHz wide bandwidth, it is readily seen that, in the general case, the interference caused to receiver frequencies that are just close to the ISM band typically will depend on which one of the frequencies is used by the Bluetooth® transceiver. To illustrate the point by way of example, if a transceiver is receiving at 2.500 GHz, the experienced interference from a Bluetooth® transmitter might vary considerably depending on whether the Bluetooth® transmitter is transmitting at the upper most frequency, (i.e., close to 2.485 GHz), or whether the Bluetooth® transmitter is transmitting at the lower most frequency (i.e., close to 2.4 GHz).

Accordingly, in alternative embodiments consistent with the invention, the coexistence strategy is based on knowledge of how many of the Bluetooth® hopping frequencies that are actually being used by the Bluetooth® transceiver will actually cause interference to the co-located system.

Turning now to another aspect of embodiments consistent with the invention, a number of techniques for dynamically determining which of a number of coexistence strategies to employ have been described. However, the selection does not necessarily have to remain static. Rather, selection of a coexistence strategy can be repeated periodically so that the best strategy is used at any given moment. How frequently to repeat the selection process can vary, depending on circumstances.

In some cases, the radio environment experienced by a transceiver can change very rapidly, and this can make it advisable to repeat the coexistence strategy selection process more frequently. For example, if the interference is due to WCDMA transmissions, as described above, and where the major reason for the large output power level can be attributed to the distance between the UE and the Node B, the coexistence selection strategy can be repeated on a time-scale that corresponds to a significant change of the propagation loss from the Node B to the UE. In an urban area, this might correspond to repeating the coexistence strategy selection process every ten seconds or so, whereas in other cases repetition of the coexistence selection strategy might need to happen only once every several minutes. It can even happen (particularly in the latter case) that the duration of a session is so small that the coexistence strategy selection process is not repeated at all. The UE can determine the type of environment in which it is operating (e.g., urban, rural, etc.) based on, for example, the channel impulse response. The channel impulse response is readily available in the receiver since channel estimation is required for receiver operation.

In yet other embodiments that are consistent with the invention, the coexistence strategy is selected initially, and then used throughout an entire communication session. The UE can decide whether to perform only one selection or whether to periodically repeat the coexistence strategy selection process based on relevant factors. For example, suppose the UE knows beforehand that a session will have a very short duration, for instance because the session is just for synchronization of a small amount of data. In this case, it can decide that it will make only one coexistence strategy selection and then stick with it throughout the entire session. This has the advantage of eliminating the need for the UE to monitor the interference situation.

In still other embodiments consistent with the invention, selection of a coexistence strategy is based, at least partially, on knowledge of an expected duration of the session. If for instance it is determined that the duration of the session will be shorter than a certain threshold, it can be decided to base the coexistence on time division multiplexing, since the reduced spectral efficiency will only last for a short period of time.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a first transceiver in a first frequency band in the presence of a second transceiver operating in a second frequency band, wherein the first transceiver operates in a first communication system and the second transceiver operates in a second communication system, the method comprising:

causing the first transceiver to operate in the first communication system in accordance with a first transceiver coexistence strategy;

ascertaining an interference level at the first transceiver operating in the first communication system, the interference level being due to the second transceiver operating in the second communication system;

dynamically selecting a coexistence strategy for operating the second transceiver in the second communication system by selecting a frequency division strategy of coexistence between operation of the first and second transceivers if the ascertained interference level is less than a threshold level and selecting a time division strategy of coexistence between operation of the first and second transceivers if the ascertained interference level is above the threshold level; and causing the second transceiver to operate in the second communication system in accordance with the dynamically selected coexistence strategy, wherein the first frequency band and the second frequency band are different from one another, wherein the first frequency band and the second frequency band do not overlap one another, and wherein operation of the first transceiver in the first communication system in accordance with the first transceiver coexistence strategy is unaffected by dynamically selecting a coexistence strategy for operating the second transceiver in the second communication system and causing the second transceiver to operate in the second communication system in accordance with the dynamically selected coexistence strategy.

2. The method of claim 1, wherein the frequency division strategy relies on filtering alone to substantially eliminate interference.

3. The method of claim 1, wherein ascertaining the interference level at the first transceiver operating in the first communication system, the interference level being due to the second transceiver operating in the second communication system, comprises ascertaining a transmit power level of the second transceiver.

4. The method of claim 1, wherein ascertaining the interference level at the first transceiver operating in the first communication system, the interference level being due to the second transceiver operating in the second communication system, comprises ascertaining how close a transmit frequency of the second transceiver is to a receive frequency of the first transceiver.

5. The method of claim 1, wherein:
the first transceiver operates across a fixed bandwidth and the second transceiver utilizes frequency hopping; and
ascertaining the interference level at the first transceiver operating in the first communication system, the interference level being due to the second transceiver operating in the second communication system, comprises ascertaining how many hop frequencies of the second transceiver are within a predefined distance from one or more receive frequencies of the first transceiver.

6. The method of claim 1, wherein ascertaining the interference level at the first transceiver operating in the first communication system, the interference level being due to the second transceiver operating in the second communication system, comprises ascertaining an expected level of transmit activity of the second transceiver.

7. The method of claim 1, wherein the method is repeated periodically.

8. The method of claim 1, comprising:
determining whether a session will require more than one dynamic selection of a coexistence strategy and if so then periodically repeating the method, and otherwise making an initial dynamic selection of a coexistence strategy and then using the selected coexistence strategy throughout an entire communication session.

9. The method of claim 8, wherein determining whether a session will require more than one dynamic selection of a coexistence strategy comprises determining an anticipated length of the communication session.

10. The method of claim 1, comprising:
ascertaining an expected length of a communication session; and
comparing the expected length of the communication session with a threshold length,
wherein the method is not performed if the expected length of the communication session is less than the threshold length.

11. The method of claim 1, comprising:
selecting the threshold level as a function of a transmission scheme used by the first transceiver.

12. The method of claim 1, comprising:
ascertaining an interference level at the second transceiver operating in the second communication system, the interference level being due to the first transceiver operating in the first communication system;
dynamically selecting a coexistence strategy for operating the first transceiver in the first communication system by selecting the frequency division strategy of coexistence between the first and second transceivers if the ascertained interference level is less than a threshold level and selecting the time division strategy of coexistence between the first and second transceivers if the ascertained interference level is above the threshold level; and
causing the first transceiver to operate in the first communication system in accordance with the dynamically selected coexistence strategy.

13. An apparatus for operating a first transceiver in a first frequency band in the presence of a second transceiver operating in a second frequency band, wherein the first transceiver operates in a first communication system and the second transceiver operates in a second communication system, the apparatus comprising:
logic configured to cause the first transceiver to operate in the first communication system in accordance with a first transceiver coexistence strategy;
logic configured to ascertain an interference level at the first transceiver operating in the first communication system, the interference level being due to the second transceiver operating in the second communication system;
logic configured to dynamically select a coexistence strategy by selecting a frequency division strategy of coexistence between operation of the first and second transceivers if the ascertained interference level is less than a threshold level and selecting a time division strategy of coexistence between operation of the first and second transceivers if the ascertained interference level is above the threshold level; and
logic configured to cause the second transceiver to operate in the second communication system in accordance with the dynamically selected coexistence strategy,
wherein the first frequency band and the second frequency band are different from one another,
wherein the first frequency band and the second frequency band do not overlap one another, and
wherein operation of the first transceiver in the first communication system in accordance with the first transceiver coexistence strategy is unaffected by dynamic selection of a coexistence strategy for operating the second transceiver in the second communication system and causing the second transceiver to operate in the second communication system in accordance with the dynamically selected coexistence strategy.

14. The apparatus of claim 13, wherein the frequency division strategy relies on filtering alone to substantially eliminate interference.

15. The apparatus of claim 13, wherein the logic configured to ascertain the interference level at the first transceiver operating in the first communication system, the interference level being due to the second transceiver operating in the second communication system, comprises logic configured to ascertain a transmit power level of the second transceiver.

16. The apparatus of claim 13, wherein the logic configured to ascertain the interference level at the first transceiver operating in the first communication system, the interference level being due to the second transceiver operating in the second communication system, comprises logic configured to ascertain how close a transmit frequency of the second transceiver is to a receive frequency of the first transceiver.

17. The apparatus of claim 13, wherein:
the first transceiver operates across a fixed bandwidth and the second transceiver utilizes frequency hopping; and
the logic configured to ascertain the interference level at the first transceiver operating in the first communication system, the interference being due to the second transceiver operating in the second communication system, comprises logic configured to ascertain how many hop frequencies of the second transceiver are within a predefined distance from one or more receive frequencies of the first transceiver.

18. The apparatus of claim 13, wherein the logic configured to ascertain the interference level at the first transceiver operating in the first communication system, the interference level being due to the second transceiver operating in the second communication system, comprises logic configured to ascertain an expected level of transmit activity of the second transceiver.

19. The apparatus of claim 13, wherein the apparatus is operated periodically so as to periodically make dynamic selections of the coexistence strategy.

20. The apparatus of claim 13, comprising:
logic configured to determine whether a session will require more than one dynamic selection of a coexistence strategy and if so then periodically repeat a dynamic coexistence strategy selection process, and otherwise make an initial dynamic selection of a coexistence strategy and then use the selected coexistence strategy throughout an entire communication session.

21. The apparatus of claim 20, wherein the logic configured to determine whether a session will require more than one dynamic selection of a coexistence strategy comprises logic configured to determine an anticipated length of the communication session.

22. The apparatus of claim 13, comprising:
logic configured to ascertain an expected length of a communication session; and
logic configured to compare the expected length of the communication session with a threshold length,
wherein the logic configured to dynamically select the coexistence strategy by selecting the frequency division strategy if the ascertained interference level is less than the threshold level and selecting the time division strategy if the ascertained interference level is above the threshold level is not operated if the expected length of the communication session is less than the threshold length.

23. The apparatus of claim 13, comprising:
logic configured to select the threshold level as a function of a transmission scheme used by the first transceiver.

24. The apparatus of claim 13, comprising:
logic configured to ascertain an interference level at the second transceiver operating in the second communication system, the interference being due to the first transceiver operating in the first communication system;
logic configured to dynamically select a coexistence strategy for operating the first transceiver in the first communication system by selecting the frequency division strategy of coexistence between the first and second transceivers if the ascertained interference level is less than a threshold level and selecting the time division strategy of coexistence between the first and second transceivers if the ascertained interference level is above the threshold level; and
logic that causes the first transceiver to operate in the first communication system in accordance with the dynamically selected coexistence strategy.

25. A user equipment comprising:
a first transceiver that operates in a first frequency band in a first communication system; and
an apparatus for operating the first transceiver in the first communication system in the presence of a second transceiver operating in a second frequency band in a second communication system, wherein the first frequency band and the second frequency band are different from one another, wherein the first frequency band and the second frequency band do not overlap one another,
wherein the apparatus comprises:
logic circuitry configured to cause the first transceiver to operate in the first communication system in accordance with a first transceiver coexistence strategy;
logic configured to ascertain an interference level at the first transceiver operating in the first communication system, the interference level being due to the second transceiver operating in the second communication system;
logic configured to dynamically select a coexistence strategy by selecting a frequency division strategy of coexistence between operation of the first and second transceivers if the ascertained interference level is less than a threshold level and selecting a time division strategy of coexistence between operation of the first and second transceivers if the ascertained interference level is above the threshold level; and
logic configured to operate the second transceiver in the second communication system in accordance with the dynamically selected coexistence strategy,
wherein operation of the first transceiver in the first communication system in accordance with the first transceiver coexistence strategy is unaffected by dynamic selection of a coexistence strategy for operating the second transceiver in the second communication system and causing the second transceiver to operate in the second communication system in accordance with the dynamically selected coexistence strategy.

26. The user equipment of claim 25, comprising:
the second transceiver.

* * * * *